United States Patent
Ternullo

(10) Patent No.: US 6,950,116 B2
(45) Date of Patent: Sep. 27, 2005

(54) INTERACTIVE VIRTUAL PORTAL

(75) Inventor: Noah J. Ternullo, Pittsburgh, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 349 days.

(21) Appl. No.: 10/229,988

(22) Filed: Aug. 28, 2002

(65) Prior Publication Data

US 2004/0041788 A1 Mar. 4, 2004

(51) Int. Cl.$^7$ .............................................. H04N 13/04
(52) U.S. Cl. .......................... 345/747; 345/6; 345/419; 345/427; 345/530; 345/531; 345/536; 345/619; 345/664; 345/679; 345/782; 348/121; 348/143; 463/32
(58) Field of Search ........................... 345/757, 6, 419, 345/427, 530, 531, 536, 619, 664, 679, 782, 156, 158, 166, 173; 348/121, 143; 463/32; 342/357.01, 357.06, 357.08, 357.12; 701/207, 213

(56) References Cited

U.S. PATENT DOCUMENTS

| | | | | | |
|---|---|---|---|---|---|
| 5,214,615 | A | * | 5/1993 | Bauer | 367/128 |
| 5,227,985 | A | | 7/1993 | DeMenthon | 364/559 |
| 5,237,647 | A | | 8/1993 | Roberts et al. | 395/119 |
| 5,274,363 | A | | 12/1993 | Koved et al. | 345/2 |
| 5,436,638 | A | | 7/1995 | Bolas et al. | 345/156 |
| 5,491,492 | A | * | 2/1996 | Knapp et al. | 345/8 |
| 5,526,022 | A | | 6/1996 | Donahue et al. | 345/156 |
| 5,751,260 | A | * | 5/1998 | Nappi et al. | 345/8 |
| 5,910,797 | A | | 6/1999 | Beuk | 345/157 |
| 6,011,581 | A | * | 1/2000 | Swift et al. | 348/58 |
| 6,031,519 | A | | 2/2000 | O'Brien | 345/156 |
| 6,037,882 | A | * | 3/2000 | Levy | 341/20 |
| 6,081,271 | A | | 6/2000 | Bardon et al. | 345/419 |
| 6,084,587 | A | | 7/2000 | Tarr et al. | 345/419 |
| 6,094,180 | A | | 7/2000 | Mead, Jr. et al. | 345/8 |
| 6,123,647 | A | * | 9/2000 | Mitchell | 482/54 |
| 6,181,371 | B1 | * | 1/2001 | Maguire, Jr. | 348/121 |
| 6,388,755 | B1 | * | 5/2002 | Zhao et al. | 356/614 |
| 6,477,581 | B1 | * | 11/2002 | Carpenter et al. | 709/238 |
| 6,515,586 | B1 | * | 2/2003 | Wymore | 340/541 |
| 6,556,236 | B1 | * | 4/2003 | Swift et al. | 348/56 |
| 2002/0122072 | A1 | * | 9/2002 | Selker | 345/834 |
| 2002/0188678 | A1 | * | 12/2002 | Edecker et al. | 709/204 |

OTHER PUBLICATIONS

InterSense, Inc. IS–600 Mark 2 Precision Motion Tracker Product Literature, downloaded from www.isense.com, Oct. 2001.

InterSense, Inc. IS–900 Precision Motion Tracker Product Literature, downloaded from www.isense.com, Oct. 2001.

* cited by examiner

Primary Examiner—Bipin Shalwala
Assistant Examiner—Vincent E. Kovalick
(74) Attorney, Agent, or Firm—Perkins Smith & Cohen LLP; Peter J. Borghetti; Kathleen Chapman

(57) ABSTRACT

A system for performing interactive virtual reality sessions without constraining the mobility of a user is disclosed. The system allows a user to remain fully mobile while participating in an interactive virtual reality session. The system comprises a handheld computing device having a display, user input controls, a location sensing device and a user sensing device. To conduct a virtual reality session, a software application is loaded from a memory. Then, the computing device determines its position within a space using the location sensing device, and the user sensing device establishes a relationship between the user's eyes and display. This relationship is used to provide the user with the same perspective as would be achieved if viewing the simulated session in real life. User input controls allow the user to control aspects of the session to further enhance the user's experience.

20 Claims, 10 Drawing Sheets

SIDE VIEW OF ROOM

INTERACTIVE VIRTUAL PORTAL

BACKGROUND OF THE INVENTION

The present invention relates generally to the field of virtual reality systems and methods and more specifically to handheld systems operating as interactive virtual portals.

As processing power and display capabilities of computers continue to evolve, new applications for them are discovered. One such application area is that of virtual experiences, also known as virtual reality. Virtual reality is used to describe the simulation of real world scenes and scenarios using a computer and a display device. Virtual scenes are often incorporated into video games, marketing presentations, in work place and living environment simulations, and training materials. As used herein, virtual reality will be used to describe the simulation of real world scenes and images using a display device and real world will be used to describe scenes and images as they appear to a user if viewed in real life.

Although display and processing innovations have been used to improve virtual reality experiences for the user, they often fail to realistically duplicate the real world scenes and experiences being simulated. As such, a user's experience is not optimized. Limitations associated with prior art virtual reality systems may take many forms. For example, display devices are often too large to be moved by a user while engaged in a virtual reality session or they are attached to an essentially immovable structure such as a desk. By way of example, the Gimbal-Mounted Virtual Reality Display System disclosed in U.S. Pat. No. 6,094,180 employs a display mounted to a desk using supporting legs. The supporting legs are designed to flex as a user physically manipulates the display housing while engaged in a virtual reality session. Although the display may be displaced slightly while connected to the legs, it cannot be readily transplanted to a new location during a virtual reality session. As a result, a user's experience is not optimized while engaged in virtual reality sessions using the invention disclosed in U.S. Pat. No. 6,094,180.

In other prior art systems, the user interface to the system is cumbersome. For example, U.S. Pat. No. 5,436,638 discloses a means for yoking the viewpoint orienting muscles of the user as a way of getting user inputs into the computer. The yoking system is attached to a structure such as a desk and therefore constrains a user to a single location while engaged in a virtual reality session.

Attempts have been made to eliminate encumbrances associated with fixed displays and uncomfortable user interfaces, such as yoking devices, using holographic representations, portable displays, and motion tracking systems installed in rooms where virtual reality sessions are performed. However, these approaches also have their respective shortcomings. For example, U.S. Pat. No. 6,031,519 generates a holographic image that can be interacted with by a user; but, interaction with the image requires that the user remain in a single location, such as a chair, that is preferably within an arm's length of the displayed image. Thus, a user is essentially immobile while using the invention described in U.S. Pat. No. 6,031,519.

U.S. Pat. No. 5,910,797 employs a portable display employing a gravitational sensor for controlling screen orientation and for imparting an acceleration to a displayed object as a function of display movement. User control of an image may be further enhanced through the use of a joystick such as when a ball is moved through a maze as part of a video gaming session. Although the apparatus of U.S. Pat. No. 5,910,797 enables a user to remain mobile, it does not maximize the user's experience because the apparatus does not maintain the perspective that the user would have if viewing the same image in the real world. For example, if the user views an image of a house using the apparatus of U.S. Pat. No. 5,910,797, movement of the display imparts an acceleration to the displayed image even though the image may not appear to move if seen in the real world. This result would occur if the user moved from one location to another while viewing the house even if the user's movement would have had the effect of taking him from the front of the house to the side of the house if he were viewing the house in the real world. As such, the apparatus of U.S. Pat. No. 5,910,797 does not retain the real world viewpoint for a user while engaged in a virtual reality session using the invention.

Fixed-in-place motion tracking systems (FIP systems) such as the IS-600 marketed by InterSense may be installed in facilities where virtual reality sessions will take place. FIP systems normally attach to the ceiling of a room and comprise one or more transponder units for sending and receiving signals to a device such as a virtual reality headset worn by a user. In addition, FIP systems normally employ a processing system for controlling the transponder units and headset. FIP systems have several disadvantages associated with them. First, they require modifications to facilities where virtual reality sessions will occur because they must be installed above, or around, the area where a user will partake in virtual experiences. Therefore, virtual sessions are limited to the room, or rooms, where the equipment is installed thus limiting the types of virtual sessions employed. Second, special processing hardware is normally required to drive the transponder units mounted on ceilings and/or walls. Since processing hardware normally requires A/C power from a wall outlet, it is normally sized in such a way that it is not readily transportable. Third, software applications and images may not be readily available for the system because they must be customized to work with a particular FIP system. As a result of the above-mentioned shortcomings, widespread use of FIP systems is inhibited and user experiences are not optimized.

There exists a need for a handheld virtual reality display system for providing a user with freedom of movement while at the same time maintaining the perspective that the user would have if viewing a displayed image in the real world. The system should function as a portal, or window, in that it provides a user with ability to see displayed images, or virtual representations, while moving about a space with which the displayed images are associated.

SUMMARY OF THE INVENTION

To attain the advantages and in accordance with the purposes of the invention as embodied and broadly described herein, the invention is directed to a portable computing device for performing an interactive virtual reality session for a user operating in a predefined space. The device includes a means for storing machine-readable instructions that control its operation; means for retrieving instructions from the storing means; means for sensing the location of the device within the space; means for inputting user data into the device; means for processing the instructions, the location and the user data to manifest a virtual reality session; and, means responsive to the operation of the processing means for displaying the virtual reality session to the user. The device may also utilize a user transponder for obtaining information about a relationship between the device and the user.

In another aspect, the invention is directed to a method for performing a virtual reality session in a portable computing device. The method comprises storing machine-readable instructions for controlling operation of the device; retrieving the machine-readable instructions; sensing a location of the device with respect to a space that it is operating in; determining a relationship between a user and the device for establishing a viewing perspective for the user while engaged in the virtual reality session; receiving user input data; processing the machine-readable instructions using a processor to manifest the virtual reality session; making the user input data available to the processor; and, displaying the information to the user during a virtual reality session.

It is to understood that both the foregoing general description and the following detailed description are exemplary and explanatory only and are not restrictive of the invention, as claimed.

DETAILED DESCRIPTION OF PREFERRED EMBODIMENTS

The disclosed invention allows a user to participate in virtual experiences within a space in an unencumbered manner. While using the invention, a user is not constrained to a single location nor do they have to wear cumbersome headsets as may be the case with prior art virtual reality systems. The space operated in by a user may be indoors, e.g. an office or classroom, or it may be outdoors. Before describing details associated with embodiments of the present invention, selected terms and coordinates will be defined. The definitions, descriptions, and examples used herein are intended to be illustrative in nature, and, as such, they should not be construed in a manner limiting the scope, or use, of embodiments of the present invention.

Figure 1:
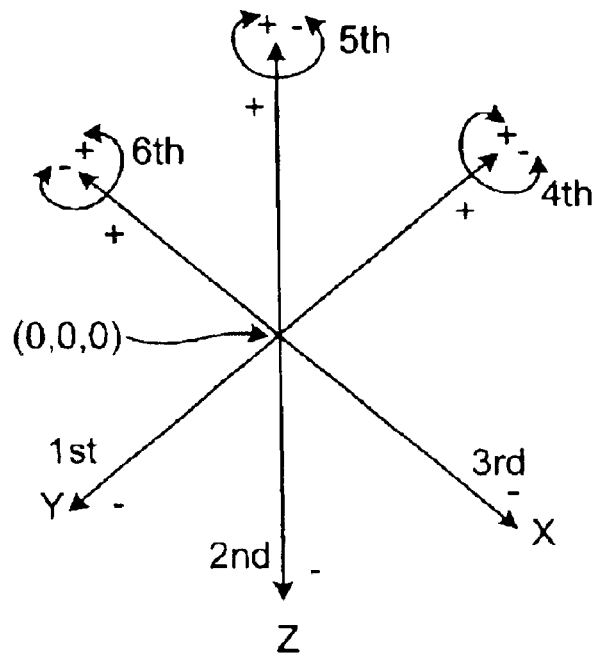
FIG. 1 illustrates a conventional arrangement for describing six degree of freedom devices and applications as used in the prior art.

FIG. 1 illustrates a conventional coordinate system useful for describing movement of an object in a three dimensional (3D) space such as a room. The coordinate system in FIG. 1 is referred to as a six degree of freedom (6DOF) coordinate system because it facilitates description of movements using six references. For example, a 3D space may be referenced using three mutually perpendicular axes, here x, y, and z. Where each axis represents a degree of freedom. In most applications, the axes will be oriented such that the x and y axes form a plane (herein referred to as xy plane) parallel to the earth, or floor, and the z axis is oriented such that the zy and zx planes are perpendicular to the earth. Locations of, and movements of, objects can be described in terms of an x, y, z location such as (0,0,0), which is referred to as the origin of the x, y, and z-axes.

The coordinate system of FIG. 1 may also be used to describe rotations about each of the x, y and z-axes. Each rotation about an axis is also referred to as a degree of freedom (DOF) and when taken together with the x, y and z-axes produce six degrees of freedom for describing objects within a 3D space described by the coordinate system. For example, rotation about the y-axis is identified as the $4^{th}$ DOF, rotation about the z-axis as the $5^{th}$ DOF, and rotation about the x-axis as the $6^{th}$ DOF.

To further aid describing movements and locations of objects within the 3D space, intersections of axes make convenient reference locations from which objects can be located. As previously noted, the intersection of the x, y and z-axes at their respective midpoints is denoted as (0,0,0) and is referred to the origin. From the origin, displacements along one or more axes may be defined using convenient units of distance measure such as feet, inches, centimeters, or the like. As noted in FIG. 1 each DOF has a positive (+) and negative (−) direction associated with it to aid in establishing the location and orientation of objects located within the 3D space. In addition, degrees of freedom may also be referenced to each other using conventions such as the right-hand-rule (RHR) or the like.

Figure 2A:
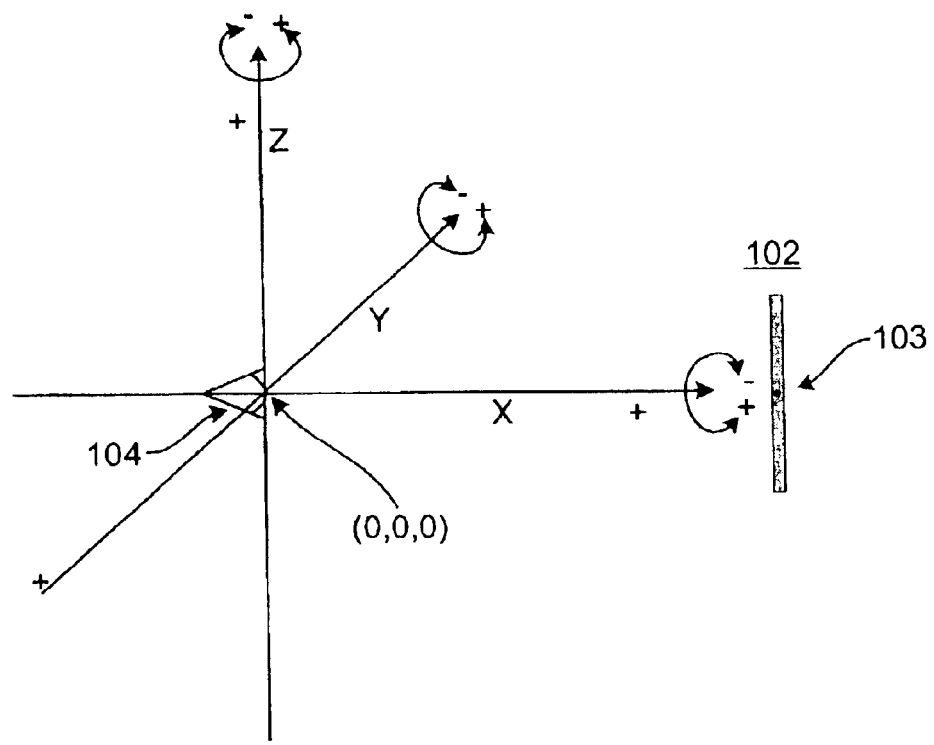
FIGS. 2A–H illustrate axes, orientations, and viewing orientations useful for describing embodiments of the invention.

FIG. 2A illustrates a 6DOF coordinate system used in conjunction with a user interacting with an embodiment of the invention. The origin of the x, y, and z-axes may be located proximate to a user's eye 104, hereinafter referred to as eye 104. For example, the origin may be located approximately at the center of a user's head such that they xy plane passes through the pupils of the user's eyes. Using such an orientation for the origin allows the location of virtual portal 102, hereinafter referred to as portal 102, to be conveniently referenced along the x axis as shown in FIG. 2A. In addition, the geometry along the x-axis may be such that the positive x-direction extends from eye 104 to portal 102. When referring to portal 102, center-of-gravity (CG) 103 will be used to refer to a central point of portal 102. As such, CG 103 serves as a convenient reference point for describing motions imparted to, and displacements of, portal 102.

Figure 2B:
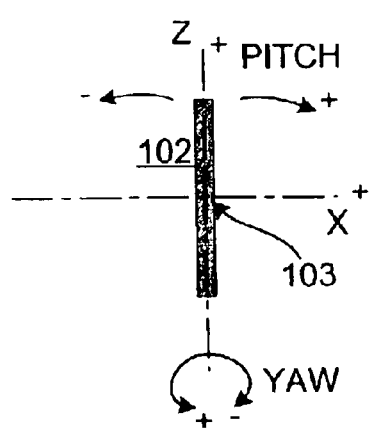

FIG. 2B illustrates portal 102 superimposed over x and z-axes intersecting at CG 103. Pitch describes a fore-aft movement of portal 102 with respect to eye 104 when pivoted about an xy plane passing substantially through CG 103. Positive displacement for pitch occurs when the top of portal 102 is moved away from eye 104. Yaw describes a rotational movement, or spinning, of portal 102 about a z-axis passing through CG 103 as shown in FIG. 2B. For the user, yaw results in either the left or right side portion of portal 102 being moved toward or away from eye 104.

Figure 2C:
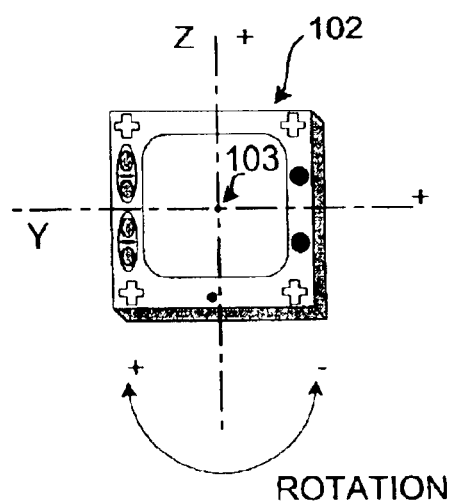

FIG. 2C illustrates portal 102 superimposed over y and z-axes intersecting at CG 103. In FIG. 2C, the x-axis protrudes from the page with the negative x direction closer to the reader. Rotation is used to describe movement of portal 102 around an x-axis passing horizontally through CG 103 as shown in FIG. 2C. The RHR may be used to establish the direction of positive rotation with respect to the x-axis.

Figure 2D:

FIG. 2D illustrates an exemplary convention useful for identifying movement of a user and/or virtual portal 102 relative to the page on which the referenced figure appears. As seen in FIG. 2D, direction into the page is identified using a circle with an "X" inside it and direction out of the page is identified using a circle with a "●" centered inside it.

Figure 2E:
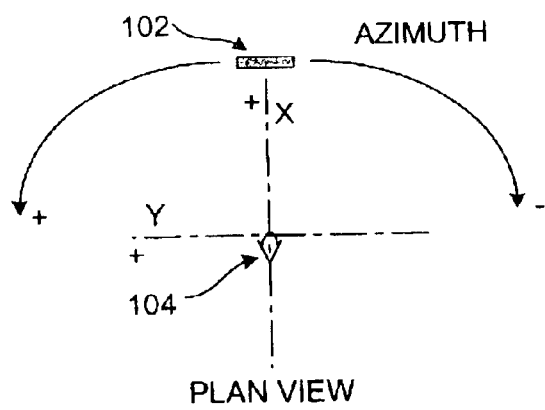

FIG. 2E illustrates a plan view showing x and y-axes having an origin at eye 104. FIG. 2E shows azimuth which is used to describe an arcing movement of portal 102 with respect to eye 104 that is substantially in the xy plane. The positive direction for azimuth may be determined using the RHR with respect to the z-axis. Typically azimuthal movement will be accomplished with portal 102 at a substantially constant radius from eye 104. A substantially constant radius may be obtained, for example, by a user if his arms are maintained at a relatively constant extension while holding and moving portal 102.

Figure 2F:
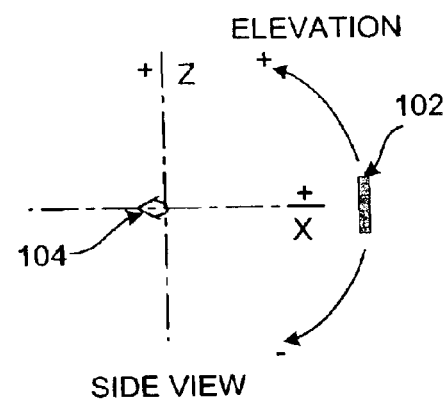

FIG. 2F illustrates a view as seen along the positive x-axis. In FIG. 2F, the xz plane is shown along with eye 104 and virtual portal 102. FIG. 2F shows elevation, which is used to describe movement of portal 102 above or below the xy plane. The positive direction for elevation is above the xy plane.

Thus far, a single x, y, z coordinate system has been used to reference the relationship of portal 102 to a user. While a single coordinate system is convenient for describing the relationship of a user to portal 102 or the relationship of a user to an environment in which they are operating, e.g. a room, the single coordinate system may become cumbersome when describing the location of a user in a 3D space in conjunction with the relationship of portal 102 and eye 104. A second coordinate system will be employed to distinguish the user's location within a 3D space from the user's relationship with portal 102. The x, y, z coordinate system used thus far will be referred to as a local coordinate system and it will be used to describe the relationship of the user, or eye 104, to portal 102. As such, the local coordinate system may move with a user such that the origin (0,0,0) resides substantially at the center of a user's head proximate to eye 104. The second coordinate system will be referred to as a global coordinate system because it will remain stationary with respect to a user and portal 102. Since the global coordinate system remains stationary, it will describe the environment that the user is operating in and not the relationship between the user and portal 102. The global coordinate system will have x, y and z-axes denoted as x', y' and z' to distinguish them from the axes associated with the local coordinate system. Coordinates associated with the global coordinate system will be written using a prime notation, e.g. (0',0',0') will reference the origin for the global coordinate system.

Figure 2G:
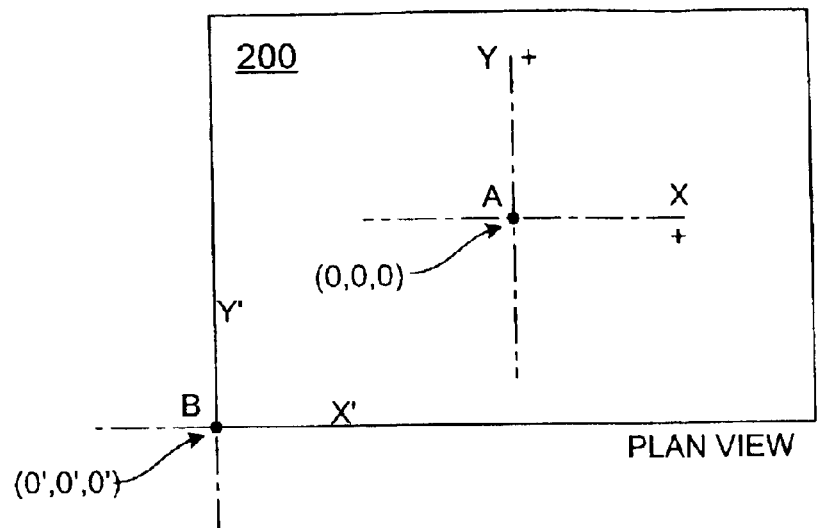

FIG. 2G illustrates the use of a global and local coordinate system useful for describing movement(s) of a user in conjunction with portal 102. Here, the global coordinate system is aligned with a geometric corner of room 200 where the user and portal 102 are located. The origin for the global coordinate system is located at B with the positive z' axis protruding from the page toward the reader. Also shown in FIG. 2G is a starting location of the user, or eye 104, indicated as position A.

Figure 2H:
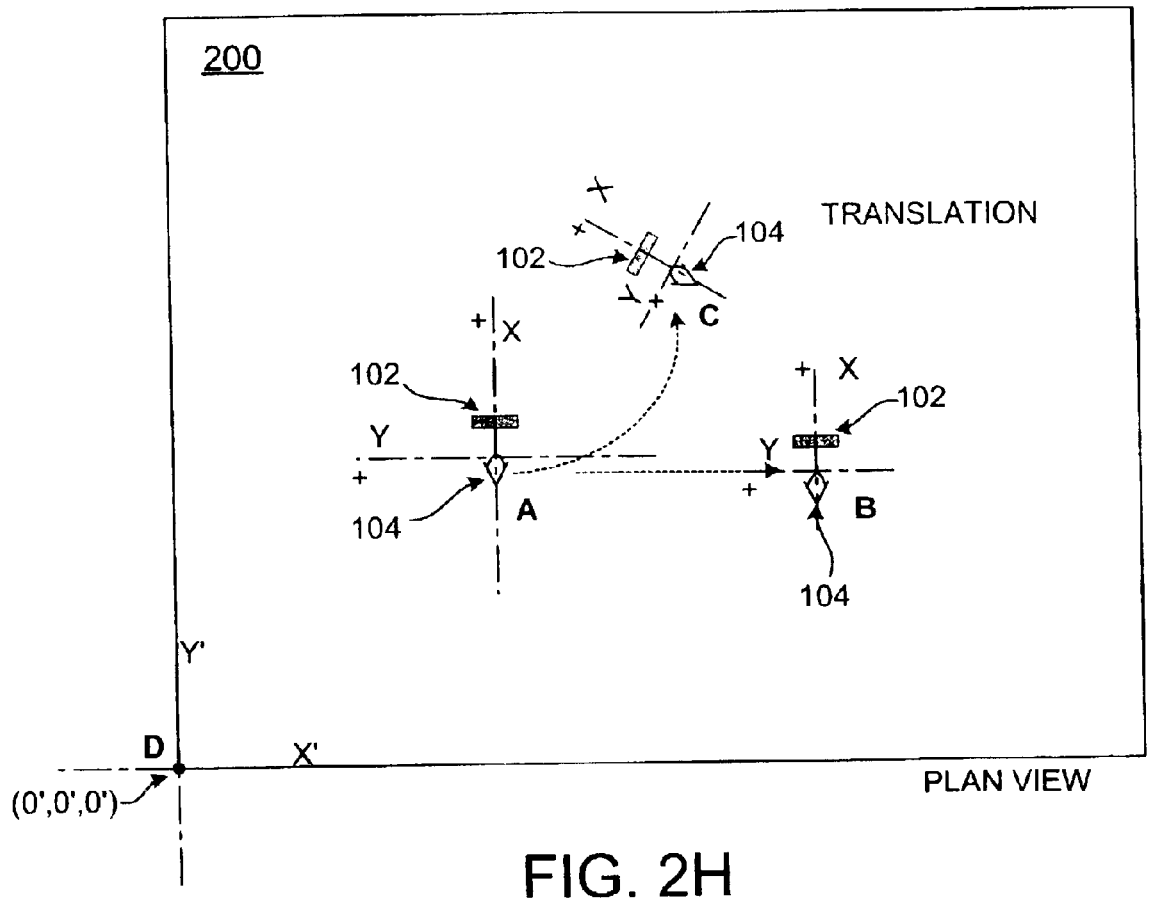

FIG. 2H further illustrates the use of global and local coordinate systems for describing the location of a user and the orientation of portal 102 with respect to eye 104. In FIG. 2H, the user's initial position within room 200 is at A. While using portal 102, the user may physically move to one or more new locations within room 200. Translation may be used to describe the movement of a user from one location to another such as from A to B or from A to C in FIG. 2H. As can be seen in FIG. 2H, the global coordinate system, shown as D, remains stationary with respect to room 200 while the local coordinate system associated with a respective user location, here A, B, and C respectively, moves with the user. As shown in FIG. 2H, the local coordinate system for a given location may also be oriented in a consistent initial position such as by having portal 102 on the x-axis with the origin located at eye 104.

Figure 3:
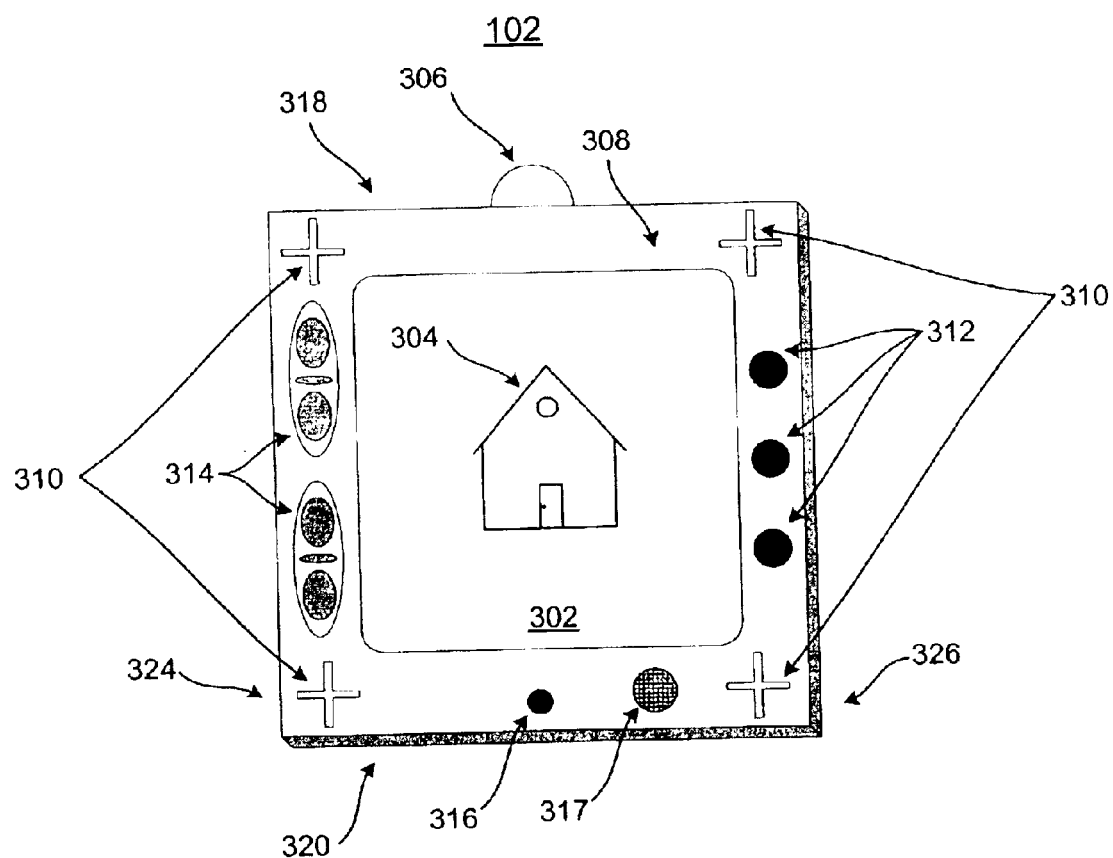
FIG. 3 illustrates an exemplary embodiment of the invention.

FIG. 3 shows an embodiment of portal 102. Portal 102 is generally in the shape of a conventional handheld computing device and it comprises display 302, a location transponder 306, a front face 308, one or more user transponders 310 one or more, control buttons 312, one or more toggle switches 314, on/off switch 316, and speaker 317. Additionally, the embodiment of portal 102 may have an upper portion 318, a lower portion 320, a left-hand portion 324, and a right-hand portion 326. Display 302 may be comprised of a conventional display device that lends itself to portable computing applications. It is preferable that display 302 be substantially flat to facilitate easy viewing by eye 104. Examples of display devices that may be used in portal 102 are, but are not limited to, a liquid crystal display (LCD), a flat plasma display, cathode ray tube (CRT), or the like. In addition, display 302 may be a touch sensitive display wherein touch sensitive is used to denote that user inputs can be conveyed to portal 102 directly through display 302. A touch sensitive embodiment of display 302 may be operated using a stylus, a user's finger, light pen, or the like. Display 302 is used for displaying text and images 304 to a user of portal 102.

Location transponder 306 is shown protruding from upper portion 318 of portal 102. Transponder 306 is used to determine the physical location of portal 102 within an environment such as a room, building, outdoor area, or the like. When used indoors, transponder 306 may sense the dimensions of the space where portal 102 is operating. When sensing the dimensions of a space, such as a room, transponder 306 may employ acoustic, optical or radio-frequency (RF) signals such as those generated by ultrasonic transducers, lasers, or RF transponders, respectively. When using transmitted signals, transponder 306 emits a waveform that contacts the walls and/or ceiling of a room and is then reflected back to transponder 306. By computing the elapsed time between sending a signal and receiving its reflection from a surface, the distance from transponder 306 to the surface can be determined.

Figure 4A:
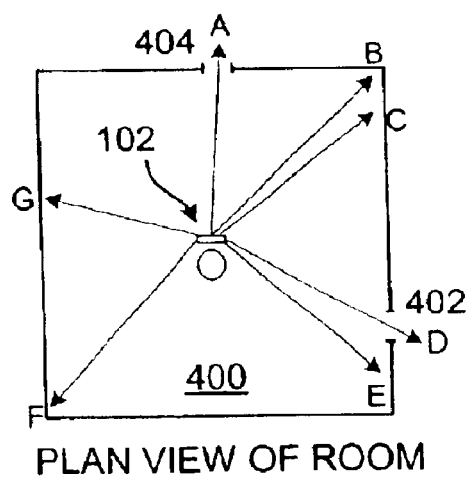
FIG. 4A and B illustrate a plan view and side view, respectively, of an exemplary space in which embodiments of the invention may be employed.
Figure 4B:
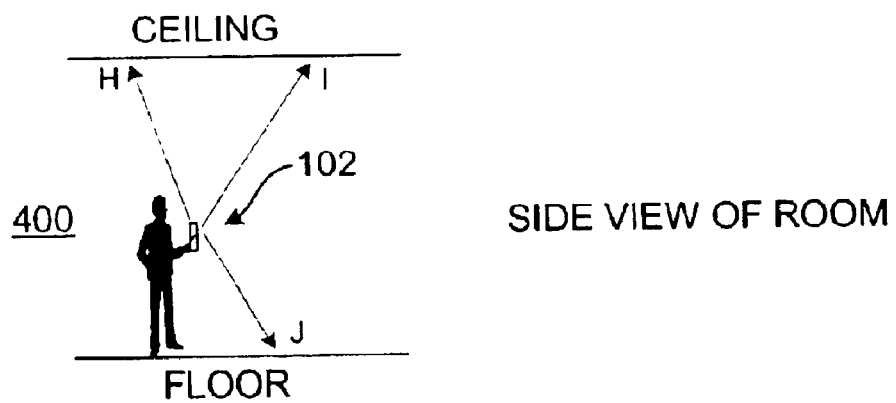

FIG. 4A and 4B illustrate signals originating at transponder 306 within room 400. As shown in FIG. 4A, multiple transmissions shown as signals A–F may be used to accurately determine the boundaries of room 400 including openings such as doorways 402 (signal D) and windows 404 (signal A). Doorways 402 and windows 404 will not produce a reflected signal when they are open; however, transponder 306 may determine their size and location using information from reflected signals that are returned from the immediate vicinity of doorway 402 or window 404. FIG. 4B shows transmissions H–J which may be used to determine the height of portal 102 off of a floor (signal J) and the distance from portal 102 to a ceiling (signals H and I). When generating multiple transmissions for sensing the size of a space, transponder 306 may use a single transponder that is gated and steered at varying angles for each transmission, or it may employ a plurality of transponders each aimed at a fixed, or variable, angle with respect to portal 102. Techniques and apparatus for detecting the size of a space and objects located therein are readily known in the art; as such, they will not be described in detail herein.

Transponder 306 may employ other location determining means in conjunction with, or in place of, those used for sensing the boundaries of spaces. For example, transponder 306 may utilize global positioning system (GPS) receiving means for determining the position of portal 102 in terms of latitude and longitude. Use of a GPS receiver is especially beneficial when using portal 102 outdoors or in very large spaces where obtaining reflected signals would be unreliable. In addition, portal 102 may utilize a compass, tilt sensor, inertial sensor, or the like, alone or in combination with other location determining means for establishing the position of portal 102 with respect to an environment.

Returning again to FIG. 3, portal 102 contains a front face 308 that lies between display 302 and the outer edges of top portion 318, bottom portion 320, left hand portion 324, and right-hand portion 326. Front face 308 provides a convenient surface for mounting user operated controls such as control buttons 312, toggle switches 314, on/off switch 316, and the like. In addition, front face 308 may contain devices such as user transponders 310 or speaker 317. Portal 102 will normally be fabricated out of a semi-rigid material such as plastic, aluminum, titanium, composite, or the like, so that a user can hold portal 102 without.

User transponders 310 are used to determine the location of eye 104 in relation to portal 102. While four user transponders 310 are shown in FIG. 3, a single user transponder 310 may be employed. User transponders 310 may be designed to detect the position of a user's eye with, or without, the aid of user worn devices such as special eyeglasses. If user transponder 310 detects the position of a user's eye with respect to portal 102 without the aid of user worn devices it may do so using sensing means such as an optical or acoustic transponder. If user transponder 310 operates in conjunction with a user worn device, then it may employ other types of signals such as radio-frequency (RF) instead of, or in addition to, the optical and acoustic signals used without user worn devices. User worn devices are employed when it is desirable to have a passive, i.e. unpowered, or active, i.e. powered, reference located proximate to eye 104 for accurately establishing its location and orientation relative to portal 102. If a user worn device is employed, typically it will be in for form of special eyeglasses designed to help accurately establish a relationship between eye 104 and portal 102; however, user worn devices, if employed, are not limited to eyeglasses.

Control buttons 312 may be placed on front face 308 to allow a user of portal 102 to control aspects of a virtual reality session. Examples of typical operations performed by control buttons 312 are, but are not limited to, controlling of image aspects such as zooming in or out, rotating the image, initiating a simulation session, or the like. In addition, control buttons 312 may be used for activating speaker 317, turning user transponders 310 on or off, and the like.

Toggle switches 314 may be used by a user to control operation of portal 102 in conjunction with, or in place of, control buttons 312. Whereas control buttons 312 typically provide an on or off functionality, toggle switches 314 allow for linearly varying inputs such as would be useful for controlling the contrast of display 302 or for varying the volume of speaker 317. In addition, toggle switches 314 may be used for activating and scrolling through menus shown on display 302 and for controlling aspects of image 304. For example, toggle switches 314 may be used for moving image 304 up or down on display 302 or for changing the orientation of image 304 such as by rotating it on display 302.

Figure 5:
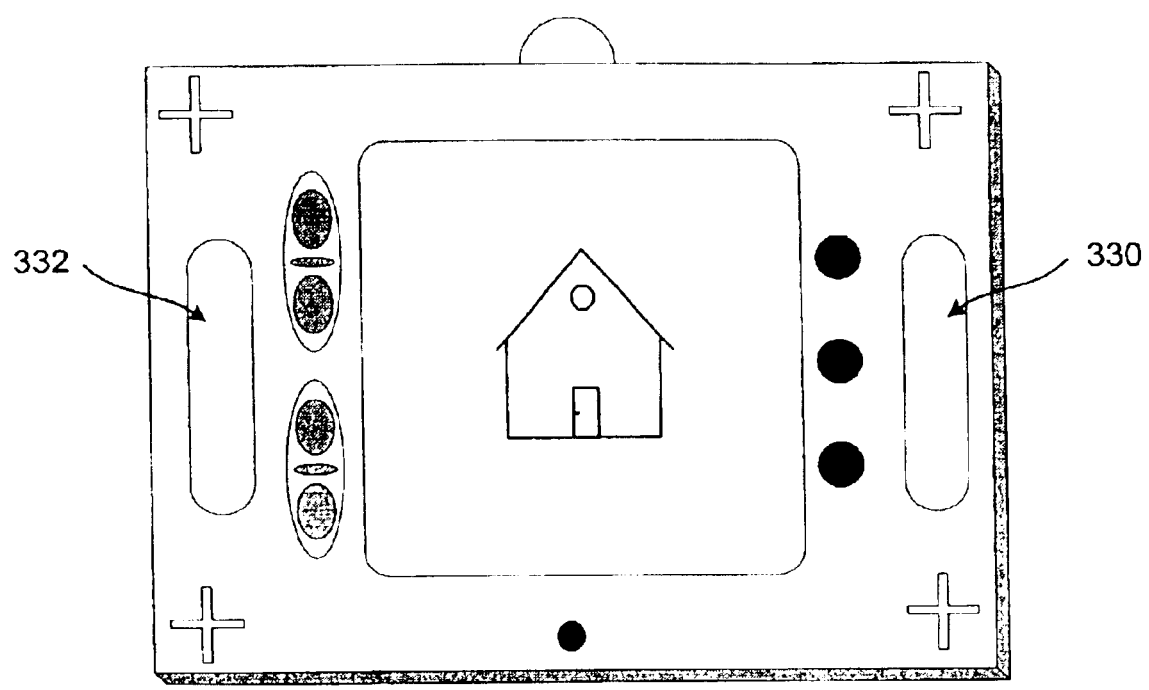
FIG. 5 illustrates an embodiment of the invention employing user handholds.

FIG. 5 illustrates an alternative embodiment of portal 102, shown as 102*a,* which includes a right handhold 330 and a left handhold 332. In some embodiments, it may be desirable to provide handholds for increasing user comfort and control when operating portal 102*a* during a virtual reality session.

Figure 6A:
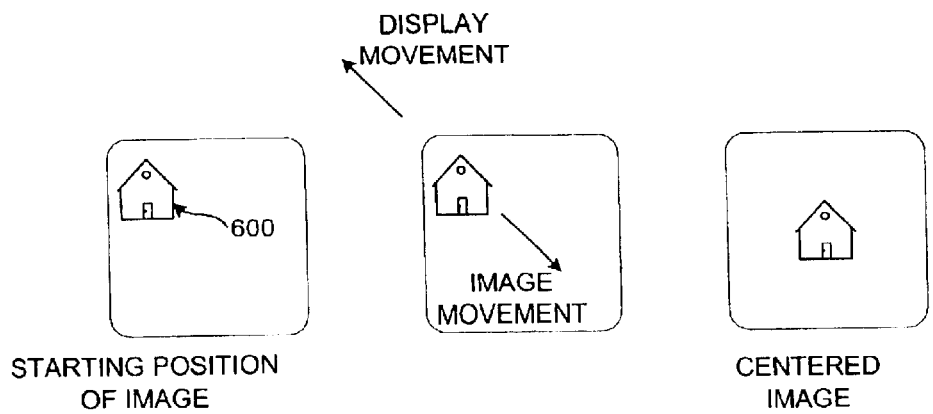
FIG. 6A and B illustrate a series of exemplary images that may be displayed using embodiments of the invention.

FIG. 6A illustrates three positions of an image of a house 600 as a function of the movement of portal 102 (display 302). In FIG. 6A the left most display illustrates the starting point of house 600. As display 302 is moved in an upward and leftward movement, shown in the central portion of FIG. 6A, house 600 moves downward and toward the right corner of display 302. The rightmost portion of FIG. 6A shows house 600 centered in display 302.

Figure 6B:
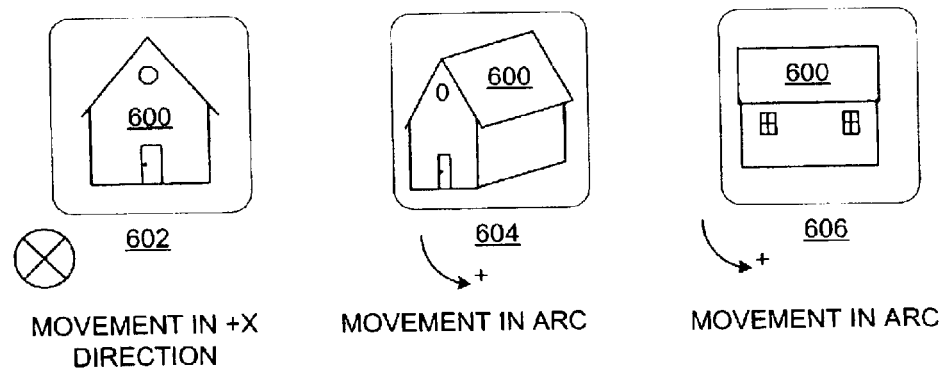

FIG. 6B illustrates three views of house 600 that will be used in describing the operation of portal 102 in conjunction with a user participating in a virtual reality session. The leftmost portion of FIG. 6B illustrates a front view 602 of house 600. In FIG. 6B, movement of a user along the positive x-axis is into the page and has the effect of making house 600 appear to move closer to the user and thus become larger and more detailed on display 302. The central portion of FIG. 6B illustrates a corner view 604 of house 600. Corner view 604 is produced when the user traverses in an arc while viewing house 600. As the user continues to traverse the arc, the view of house 600 transitions from corner view 604 to side view 606, which is shown in the rightmost portion of FIG. 6B. If the user were to travel in a backward direction (i.e. movement in the negative x direction) house 600 in side view 606 would become smaller and less detailed in appearance. As seen by the display representations of house 600 in FIG. 6B, portal 102 provides a user with the same views that would be obtained while moving and viewing house 600 in the real world.

Figure 7:
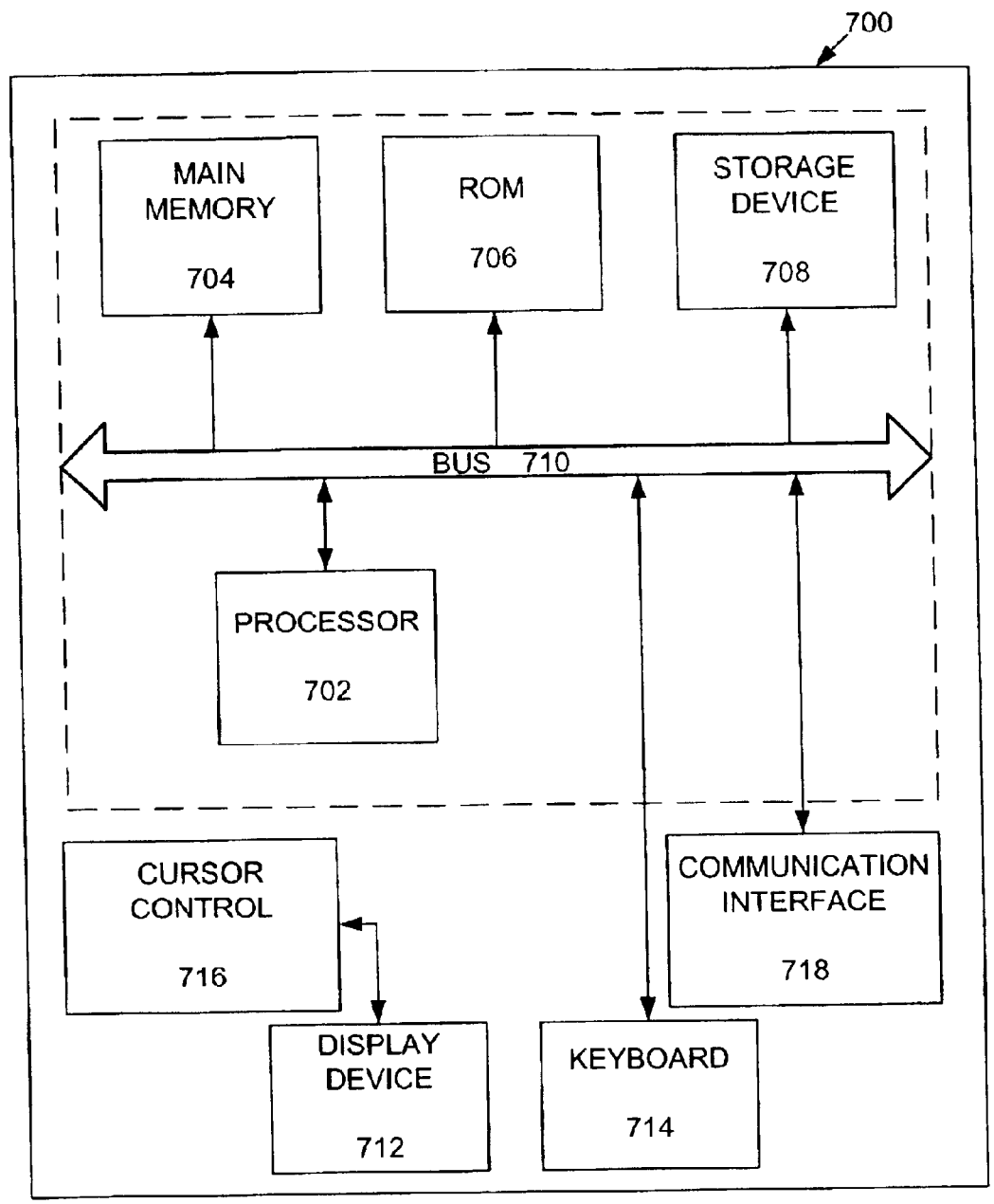
FIG. 7 is a schematic diagram showing a general purpose computer that may be adapted for practicing embodiments of the invention.

FIG. 7 contains a schematic diagram of a conventional computing apparatus that may be used for practicing embodiments of portal 102. Computer 700 may contain processor 702, main memory 704, read only memory (ROM) 706, storage device 708, bus 710, display device 712, keyboard 714, cursor control 716 and communication interface 718. Processor 702 may be any type of conventional processing device that interprets and executes machine-readable instructions. Main memory 704 may be a random access memory (RAM) or a similar dynamic storage device. Main memory 704 stores information and instructions for execution by processor 702. Main memory 704 may also be used for storing temporary variables or other intermediate information during execution of instructions by processor 702. ROM 706 stores static information and instructions for processor 702. Storage device 708 may include any type of magnetic or optical media and its corresponding interfaces and operational hardware. Storage device 708 stores information, such as data, and instructions for use by processor 702. Bus 710 includes a set of hardware lines (conductors, optical fibers, or the like) that allow for data transfer among the components of computer 700.

Display device 712 will typically be a liquid crystal display (LCD) device for allowing a user to remain mobile while using portal 102; however, other types of display devices such as cathode ray tubes (CRT) or the like may also be used for displaying information to a user. Keyboard 714 and cursor control 716 allow the user to interact with computer 700. For portable processing applications using embodiments of the invention, cursor control 716 and keyboard 714 may be comprised of toggle switches 314, control buttons 312, or the like. In an alternative configuration, keyboard 714 and cursor control 716 can be replaced with a microphone and voice recognition means to enable a user to interact with computer 700 using voice prompts.

Communication interface 718 enables computer 700 to communicate with other devices/systems via any communications medium. For example, communication interface 718 may be a wireless modem, Ethernet interface to a LAN, interface to the Internet, printer interface, etc. Alternatively, communication interface 718 can be any other interface that enables communication between computer 700 and other devices, systems or networks. Communication interface 718 can be used in lieu of keyboard 714 and cursor control 716 to facilitate remote control and communication with computer 700.

Figure 8:
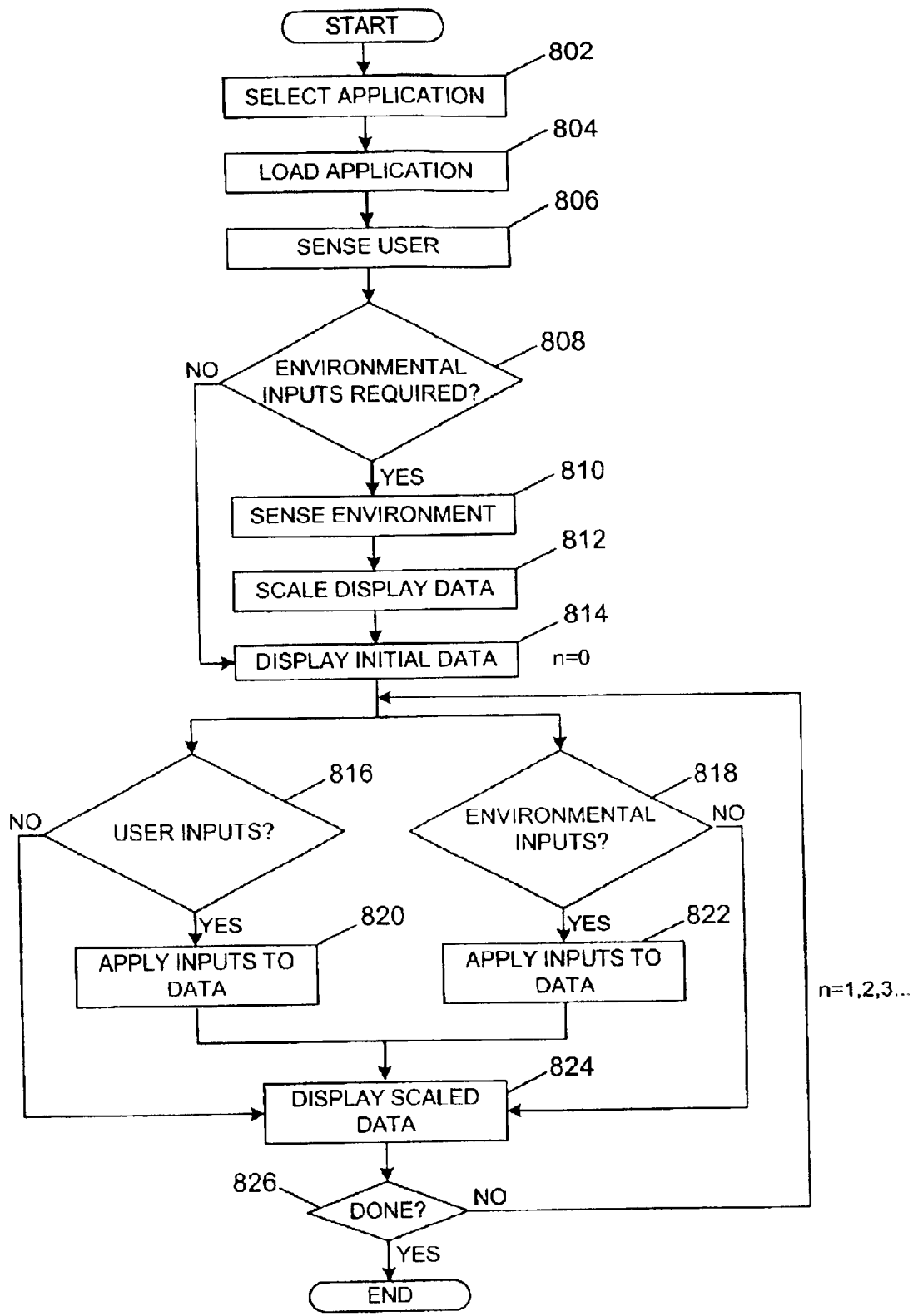
FIG. 8 is a flowchart of an exemplary method that may be used when practicing embodiments of the invention.

FIG. 8 presents a flowchart illustrating a method for using portal 102 to conduct an interactive virtual reality session. To aid the discussion associated with FIG. 8, an example scenario will be described. The example scenario will involve a user (referred to as the client) using portal 102 to evaluate space in an office building that will be used as a doctor's office. The space being evaluated is presently bare with each room comprising a doorway, bare walls, and ceilings. The example used in conjunction with FIG. 8 is exemplary in nature and is in no way is intended to limit the scope of embodiments of portal 102 or uses associated therewith.

In FIG. 8, the client selects a software application for execution on portal 102 (step 802). Here the software application is a 3D architectural simulation of a proposed layout for the doctor's office. The simulation contains room layouts that include furniture, wall hangings, cabinets, countertops, and the like. Next, the selected software application is loaded into main memory 704 for execution by processor 702 (step 804). Portal 102 then senses eye 104, associated with the client, using user transponders 310 (step 806). Portal 102 then determines if environmental inputs are required (step 808). Examples of environmental inputs are room sizes, identification of topographic features when outdoors, and the like. If environmental inputs are required, portal 102 may obtain them using location transponder 306 or other means (step 810). Here portal 102 uses an ultrasonic transponder to determine the size of the office, locations of doorways and ceilings, and the client's position within the space. After sensing the environment, the display data is scaled (step 812). In the example, display scaling may involve using data obtained from location transponder 306 to adjust display data so that a given room is scaled such that it occupies the entire display area. After scaling display data, an initial starting display is created and presented to the user (step 814). For example, if portal 102 senses that the client is standing in a doorway to the office, the initial display would present the client with a view that would be the same as that seen if the actual office layout were complete and being viewed from the same doorway. If a simulation is being done that does not require inputting environmental parameters in step 808, the method may skip steps 810 and 812 to arrive at step 814.

After presenting an initial display to the user, portal 102 checks for user inputs (step 816) and environmental inputs (818). If user inputs are detected, they may be applied to displayed data or other data residing in portal 102 (step 820). After applying user inputs to the data, the displayed image is resealed (step 814). In the doctor's office example, the client may be standing in the waiting room area while viewing simulations of chairs and coffee tables being contemplated for installation in the room. If the client has been provided with a choice of upholstery fabrics for the chairs, he may use control buttons 312 or toggle switches 314 to toggle through available fabrics and patterns while viewing a particular chair or group of chairs on portal 102. If environmental inputs are detected, e.g. portal 102 detecting that the user has left the waiting room and entered an examination room, in step 818, they are applied to data residing in portal 102 (step 822) and displayed to the user (step 824). If user inputs and environmental inputs are not required in steps 816 and 818, respectively, the method may go directly to step 824. Portal 102 then checks to see if the simulation is finished (step 826). If the simulation is completed, the method ends; however, if the simulation is not done, control reverts back to steps 816 and 818. Sensing of user inputs and environmental inputs continues throughout a simulation. As user and environmental inputs are encountered, the loops commencing with step 816 and 818 are processed as needed in order to provide the user with a robust simulation.

In the example, if the client stands in the office doorway and moves portal 102 azimuthally, the displayed images will move to present the client with the same view that would be seen in the real world if the office were finished. Control buttons 312 or toggle switches 314 may be used to zoom in so the client sees more detail (i.e. a narrower field of view) or zoom out so the client sees less detail (i.e. a wider field of view). If the client does not want to zoom in or out using controls on portal 102 he may walk toward, or away, from a simulated feature while holding portal 102 to obtain the same effect. The client, while standing in the office doorway, may then change the yaw of portal 102 to obtain the perspective that would be observed if he were looking into the actual office through the doorway at an angle. If the client is using portal 102 to view a simulated object that is in the center of the office, such as a coffee table, he may move in an arc around the simulated feature to obtain the same perspectives that would be achieved if duplicating the movements around an actual object located in the office. If the client is standing in the doorway of an examination room, he may view overhead cabinet selections by elevating portal 102 until simulated cabinets come into view. Operating control buttons 312 may cause the doors on the simulated cabinets to open so that the client can observe the proposed shelf layout.

While portal 102 has been described in conjunction with the simulation of interior layouts in conjunction with FIG. 8, it may also be used for simulating outdoor scenes (not shown). For example, a client may use portal 102 to view a simulation of a house while standing in a barren building lot. In an outdoor application, location transponder 306 may be comprised of a GPS receiver and/or a digital compass. When the client loads the house simulation, he would be presented with same view that would be encountered if viewing the actual house on the lot. While holding portal 102, the client can move in an arc to obtain different viewpoints with respect to the simulated house such as front view 602, corner view 604 and side view 606. The client can also use control buttons 312 or toggle switches 314 to manipulate the simulated house without having to change his geographic position. In addition, if the client walks toward the simulated house and stops at a doorway, such as a garage door, he can use control button 312 to open the simulated garage door to gain a perspective of the inside of the garage. If the client then moves portal 102 azimuthally 180 degrees, so that he is facing away from the garage interior, he would be presented with a view of the simulated driveway and yard as seen from the garage door. As demonstrated by the house example, portal 102 can be used to accurately simulate many types of situations while allowing a user to remain highly mobile thus making for a more realistic simulation.

From the foregoing discussion of preferred embodiments, it can be seen that portal 102 offers a flexible solution to simulating virtually any scenario. In addition, those skilled in the relevant arts will recognize that portal 102 may be implemented in alternative embodiments and may be used for applications other than those described hereinabove. For example, portal 102 may be embodied in a distributed system wherein the processing hardware is not collocated with the display. In this alternative embodiment, processing hardware and location sensing hardware may be worn on the user's body such as on a belt while the display and user controls are handheld or worn on the user's wrist. Separating the processing and location sensing means from the display hardware allows a system designer to make the display lighter weight for adding to user comfort.

In a second alternative embodiment, the processing hardware may be collocated with one display, referred to as a master unit, and wirelessly networked to one or more other displays, referred to as slave units, which are operated by additional users. The master unit obtains location information and configures data for display to the users holding slave units. Slave units communicate with the master unit to establish their respective locations in relation to the master unit. The slave units may then display data to their respective users in a manner that is scaled to present each user of a slave unit with the proper perspective. Employing a master and slave arrangement makes it possible for groups of users to simultaneously participate in a virtual reality session.

As can be seen from the alternative embodiments and preferred embodiments discussed herein, it will be obvious to those skilled in the relevant arts that many additional embodiments and modifications are possible without departing from the spirit of the invention. Therefore, present embodiments are to be considered in all respects as illustrative and not restrictive, the scope of the invention being indicated by the appended claims rather than by the foregoing description, and all changes within the meaning and range of equivalency of the claims are therefore intended to be embraced therein.

What is claimed is:

1. A portable computing device for performing an interactive virtual reality session for a mobile user operating in a predefined space, said computing device comprising:
    means for storing machine-readable instructions for controlling operation of said portable computing device;
    means for retrieving said machine-readable instructions from said storing means;
    means for sensing a location of said portable computing device with respect to the mobile user within said predefined space;
    means for inputting user data into said portable computing device;
    means, responsive to operation of said retrieving means, said sensing means and said inputting means, for processing said machine-readable instructions, said location, and said user data to manifest said interactive virtual reality session; and
    means, responsive to operation of said processing means, for displaying said interactive virtual reality session to the mobile user.

2. The portable computing device of claim 1 wherein said sensing means comprises:
    a location transponder for determining said location of said portable computing device in said predefined space.

3. The portable computing device of claim 2 wherein said sensing means further comprises:
    a user transponder for obtaining information about a relationship between said portable computing device and the user, said information about said relationship for use in manipulating said displayed information.

4. The portable computing device of claim 3 wherein said displaying means comprises:
    a flat panel display.

5. The portable computing device of claim 3 wherein said inputting means comprises:
    an input device selected from the group consisting of a toggle switch, a control button, an on/off switch, a microphone and a touch sensitive display.

6. The portable computing device of claim 1 wherein said sensing means comprises:
    a sensor component selected from the sensor group consisting of an acoustic transponder, a radio-frequency transponder, an optical transponder and a GPS receiver.

7. A method for performing a virtual reality session in a portable computing device, said method comprising the steps of:
    storing machine-readable instructions for controlling operation of the portable computing device;
    retrieving the machine-readable instructions;
    sensing a location of the portable computing device with respect to a space that the portable computing device is operating in;
    determining a relationship between a user and the potable computing device, the relationship used to establish a viewing perspective for the user while engaged in the virtual reality session;
    receiving user input data;
    processing the machine-readable instructions using a processor, the processor capable of manipulating information contained in the machine-readable instructions to manifest the virtual reality session;
    making the user input data available to the processor; and
    displaying the information to the user during the virtual reality session.

8. The method of claim 7 wherein said step of sensing further comprises the step of:
    selecting a sensing means from the sensor group consisting of an acoustic transponder, a radio-frequency transponder, an optical transponder and a GPS receiver.

9. The method of claim 7 wherein said step of determining comprises the step of:
    establishing a relationship between an eye of the user and the portable computing device wherein the movement of the portable computing device in the space changes the relationship between the eye and the portable computing device.

10. The method of claim 7 wherein said step of receiving comprises the step of:
    obtaining said user input data from an input device selected from the group consisting of a toggle switch, a control button, an on/off switch, a microphone and a touch sensitive display.

11. A computer program product containing computer-readable code for executing a method in a processor for performing a virtual reality session on a portable computing device, said method comprising the steps of:
    storing machine-readable instructions for controlling operation of the portable computing device;
    retrieving the machine-readable instructions;
    sensing a location of said portable computing device with respect to a space that the portable computing device is operating in;
    determining a relationship between a user and the portable computing device, the relationship used to establish a viewing perspective for the user while engaged in the virtual reality session;

receiving user input data;

processing the machine-readable instructions using a processor, the processor capable of manipulating information contained in the machine-readable instructions to manifest the virtual reality session;

making the user input data available to the processor; and displaying the information to the user during the virtual reality session.

12. The method of claim 11 wherein said step of sensing comprises the step of:

selecting a sensing means selected from the sensor group consisting of an acoustic transponder, a radio-frequency transponder, an optical transponder and a GPS receiver.

13. The method of claim 11 wherein said step of determining comprises the step of:

establishing a relationship between an eye of said user and said computing device wherein the movement of the portable computing device in the space changes the relationship between the eye and the portable computing device.

14. A method for performing a virtual reality session on a portable computing device comprising the steps of:

loading machine-readable instructions onto the portable computing device, the machine-readable instructions implementing a virtual reality session;

determining the location of the portable computing device with respect to a user;

determining environmental information with respect to the user;

executing the machine-readable instructions with respect to the location of the user and the environmental information, said step of executing capable of producing simulated data; and scaling the simulated data for display on the portable computing device to enable the virtual reality session.

15. The method as defined in claim 14 further comprising the steps of:

receiving input data from the user; and repositioning the scaled simulated data based on the input data.

16. The method as defined in claim 14 further comprising the steps of:

selecting the virtual reality session from a group consisting of interior design and mechanical design.

17. A system for performing a virtual reality session on a portable computing device comprising:

means for loading machine-readable instructions onto said portable computing device, said machine-readable instructions implementing said virtual reality session;

means for determining the location of said portable computing device with respect to a user;

means for determining environmental information with respect to the user;

means for executing said machine-readable instructions with respect to said location of the user and with respect to said environmental information, said means for executing capable of producing simulated data; and means for scaling said simulated data for display on said portable computing device.

18. The system as defined in claim 17 further comprising:

means for receiving input data from the user; and means for repositioning said scaled simulated data based on said input data.

19. The system as defined in claim 17 wherein said virtual reality session comprises:

an interior design system.

20. The system as defined in claim 17 wherein said virtual reality session comprises:

a mechanical design system.

* * * * *